(12) United States Patent
Knapp

(10) Patent No.: US 7,687,764 B1
(45) Date of Patent: Mar. 30, 2010

(54) FIBER OPTIC SENSORS FOR COMPOSITE PRESSURE TANKS WITH MICRO BEND PINCH POINTS

(76) Inventor: Ronald H. Knapp, 98-030 Hekaha St. Suite 20, Alea, HI (US) 96701

( * ) Notice: Subject to any disclaimer, the term of this patent is extended or adjusted under 35 U.S.C. 154(b) by 997 days.

(21) Appl. No.: 10/804,203

(22) Filed: Mar. 19, 2004

Related U.S. Application Data

(60) Provisional application No. 60/455,587, filed on Mar. 19, 2003.

(51) Int. Cl.
  *G01J 1/04*   (2006.01)
  *G01J 1/42*   (2006.01)
  *G01J 5/08*   (2006.01)
(52) U.S. Cl. .................. 250/227.14; 250/573; 73/149
(58) Field of Classification Search .......... 250/573, 250/575–577, 227.14, 227.16, 227.15; 73/149; 385/12, 13; 128/204.26, 205.23; 220/589, 220/588, 586, 62.19; 356/73.1
See application file for complete search history.

(56) References Cited

U.S. PATENT DOCUMENTS 4,880,970 A * 11/1989 Jones ................. 250/227.16
5,200,615 A * 4/1993 Hopenfeld ............... 250/302
5,531,290 A * 7/1996 Furuichi et al. ............ 180/271
5,829,418 A * 11/1998 Tamura et al. ............. 123/529
6,042,071 A * 3/2000 Watanabe et al. .......... 248/313

FOREIGN PATENT DOCUMENTS

EP          892244 A2 *  1/1999

* cited by examiner

*Primary Examiner*—Thanh X Luu
*Assistant Examiner*—Francis M Legasse, Jr.
(74) *Attorney, Agent, or Firm*—James Creighton Wray; Meera P. Narasimhan

(57) ABSTRACT

A low-cost fiber-optic sensor system for composite pressure tanks detects structural degradation of composite material pressure tanks. Light power attenuation in embedded optical fiber simulates tank volume change and replaces hydrostatic tank testing. Current U.S. Department of Transportation rules require that all pressure tanks be hydrostatically tested to verify structural integrity. Tanks do not have to be removed from service for testing. With the invention, testing can be done in-situ. For composite LNG tanks used on vehicles or emergency inflation devices used on aircraft for escape ramps, in-situ testing offers substantial maintenance cost savings. because of the simplicity of the test procedure, more frequent structural checks can be made economically to improve the safe operation of composite tanks.

17 Claims, 13 Drawing Sheets

Macrobending　　　　　　　　Microbending

FIBER OPTIC SENSORS FOR COMPOSITE PRESSURE TANKS WITH MICRO BEND PINCH POINTS

This application claims the benefit of U.S. Provisional Application Ser. No. 60/455,587 filed Mar. 19, 2003.

This invention was made with Government support under Contract No. 44751 awarded by the Department of Transportation. The Government has certain rights in this invention.

BACKGROUND OF THE INVENTION

Lightweight composite SCBA (Self-Contained Breathing Apparatus) pressurized cylinders are in wide use in the firefighting, medical, aviation and transportation markets. Composite material (S-2 glass/epoxy, Kevlar/epoxy, carbon/epoxy, etc.) are used for life support gas cylinders, aircraft inflatables, oxygen supply applications, life support cylinders, recreational SCUBA tanks 1 (FIG. 1) and alternative fuel vehicles.

Composite pressure tanks are manufactured by overwrapping aluminum liners with hoop-wrapped or full-wrapped (axial+hoop) shells. The aluminum liner serves as an impermeable gas barrier and the composite shell provides the structure that resists the pressure, typically in the range of 3,000 to 4,500 psi. The U.S. Department of Transportation is responsible for the safe use of these tanks and requires periodic hydrostatic testing to determine the structural integrity of composite tanks.

Advantages of these tanks are light weight, corrosion resistance, dimensional stability, neutral buoyancy, and the ability to store more air than an equivalent all-metal tank. There is, however, a lower confidence level with the use of composite tanks than with metal tanks. The fatigue mechanism in composite tanks that produces matrix cracking and eventual ply failures is more complex and less predictable than for metal tanks. Another problem with composite tanks is the potential for external surface damage that comes from the kind of rough handling to which SCBA/SCUBA tanks often are subjected. Safety is a key issue. The ability to monitor structural integrity under a variety of operating conditions will be an important factor that determines future tank recertification intervals and tank life.

What is needed is a means of insuring that composite tanks are as safe to operate as metal tanks.

SUMMARY OF THE INVENTION

The invention provides a Low-cost Fiber-Optic Sensor System for Composite Pressure Tanks to detect structural degradation of composite material pressure tanks. Light power attenuation in an embedded optical fiber is used to measure tank volume change and can replace hydrostatic tank testing. Current U.S. Department of Transportation rules require that all pressure tanks be hydrostatically tested to verify structural integrity. This means that tanks have to be removed from service for testing. With the invention, testing can be done in-situ. For some applications such as composite LNG tanks used on vehicles or emergency inflation devices used on aircraft for escape ramps, etc., in-situ testing offers substantial maintenance cost savings. Also, because of the simplicity of the test procedure, more frequent structural checks can be made economically to improve the safe operation of composite tanks.

The invention is primarily for pressure tanks using a metal inner liner for sealing gas and an outer composite material overwrap for strength. The invention applies to any pressurized tank geometry. Cylindrical tanks with hemispherical or doubly-curved shell ends have immediate application.

A low-cost optical-fiber microbend sensor is used. A laser light source is attached at one end of the fiber and a light power meter at the other end of the fiber reads light power transmitted. Microbending is induced by allowing a length of fiber to cross over itself multiple times. Fiber-crossings produce pinch points that attenuate the light signal. As internal pressure is applied to the tank, radial pressure between the inner metal liner and outer composite overwrap squeeze the fiber. Where fibers cross at an angle, a stress concentration occurs that attenuates the transmission of light. With fiber crossings distributed over the surface of the tank, total light power attenuation will be an average measure of volume change of the tank.

Fiber crossing is achieved by wrapping and bonding a low-cost telecommunication optical fiber over the surface of the inner metal liner. For a cylindrical tank, this can be achieved by helically wrapping the fiber in a right-hand lay and then reversing the wrap with a left-hand lay. The lay angle is used to control the number of fiber crossings. The greater number of fiber crossings, the greater the light attenuation for a given internal tank pressure.

The technique to bond the fiber to the tank is important to the performance of the optical fiber sensor. If the adhesive is too rigid, fiber crossings might not produce sufficient signal (light power attenuation). If the adhesive is too flexible, light attenuation could become excessive, potentially resulting in a total loss of signal. Also, the type of adhesive determines the linearity of the light power signal. It is desirable that the change of light power attenuation for a change of internal pressure vary linearly with tank volume change. Experiments have shown that certain adhesive materials give nonlinear signals and others give linear.

The means of applying the adhesive between the optical fiber sensor and the metal tank liner also is critical to the operation of the sensor and tank. If too much adhesive is applied, that could interfere with the bonding of the composite overwrap and the inner metal liner. The technique used to apply a very small amount of adhesive was to pull the fiber through a volume of uncured adhesive and then to remove excess adhesive by drawing the fiber through a long flexible tube with an inner diameter selected to remove a desired amount of adhesive. The thinly-adhesive-coated fiber is then helically wrapped onto the surface of a cylindrical tank under a tension designed to achieve contact pressure between the fiber and the metal liner. This is achieved by using a rotating mandrel. The desired lay angle is achieved by coordinating the rotational and axial feed rates.

To ensure that the fibers make sufficient contact at all fiber crossings, shrink wrap tape is applied over the fiber. Heat is applied to both shrink the tape, thereby applying pressure to all fiber crossings, and to cure the adhesive.

The fiber ends are attached to optical connectors that are bonded to one end of the tank. In the case of the cylindrical metal liner, the connectors are bonded to the valve stem. Optical connectors of much smaller size than conventional connectors are a part of this invention. The fiber ends are stripped of their protective coating and epoxy-bonded into ceramic ferrules. The ends of the ferrules are polished and then placed into a metal housing with a protective metal cap. The two connectors at each end of the optical fiber sensor then are bonded to the surface of the metal liner at a convenient location such as the valve stem.

After the fiber has been bonded to the surface, it is sufficiently ruggedized for shipping and handling without damaging the delicate fiber.

Finally, the tank with attached optical fiber sensor and optical connectors is over-wrapped with composite material using normal fabrication techniques. In the case of cylindrical tanks, this is accomplished by filament-winding the tank. The installation of the fiber optic sensor is economical and does not require composite pressure tank manufacturers to alter substantially standard fabrication techniques.

Tests of prototype cylindrical composite tanks prove that the embedded microbend sensor system successfully replicates conventional hydrostatic testing. It has been demonstrated that optical power light transmission can be made to respond linearly to tank volume change.

By integrating a simple, low-cost optical fiber sensor into the composite shell, tanks can be checked easily for structural integrity each time the cylinder is refilled with gas. The opportunity to provide such continuity in structural health monitoring should have a significant positive impact on obtaining DOT certifications, extending product useful life, and establishing buyer confidence.

The design challenge has been to create an embedded Fiber Optical Sensor System (FOSS) that can detect structural faults without precipitating structural degradation of the composite material. The manufacturing challenge has been to determine a means of integrating the sensor system into the tank fabrication process. An embedded optical fiber microbend sensor, a modified type ST connector and a handheld optical laser and power meter constitute the optical sensor system that is used to monitor internal defects in the composite structure. Low-cost is obtained by using readily available optical components and a simple installation procedure, and robustness is provided by embedding the optical fiber sensor and encasing the optical connector in a metal housing.

A promising initial application of the invention would be the pressure bottles used to inflate slides 3 on passenger aircraft (FIG. 2). It is expensive to remove these bottles for hydrostatic testing and an in-situ test that could be performed with the optical sensor should result in maintenance cost savings.

The microbend sensor system can simulate conventional hydrostatic tank testing where tank dilatation (volume change) is measured in response to internal pressure. By wrapping an optical fiber around the inner metallic liner of a tank, the optical fiber will be stretched along its entire length and subjected to microbending at locations where it contacts itself. This mechanical action must be designed to produce sufficient light power attenuation in response to applied internal pressure. The light attenuation will be a measure of the dilatation of the tank, and therefore can be used as a simpler replacement to conventional hydrostatic testing.

These and further and other objects and features of the invention are apparent in the disclosure, which includes the above and ongoing written specification, with the claims and the drawings.

DETAILED DESCRIPTION OF PREFERRED EMBODIMENTS OPTICAL FIBER SELECTION

Optical fibers are manufactured for specific wavelengths of light that maximize light power transmitted through the fiber and minimize light loss as the fiber is bent. This approach is needed for telecommunication fibers where light must be transmitted over long distances. For an optical sensor, however, a different approach must be taken. Since the sensor will function as a microbend sensor, an optical fiber that is sensitive to fiber bending should be used.

Figure 1:
FIG. 1. Composite material SCUBA tank.
Figure 2:
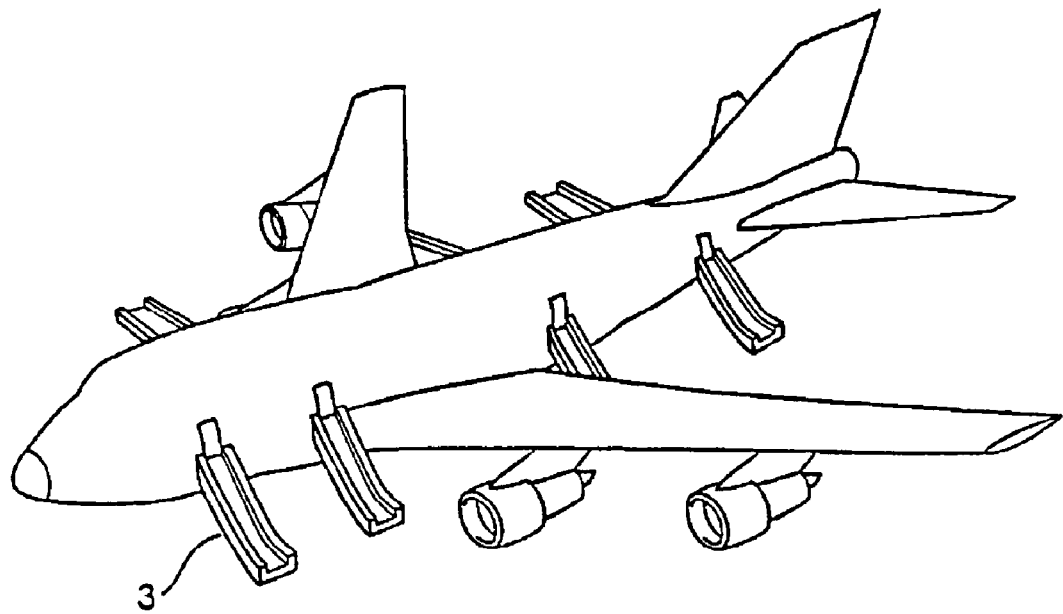
FIG. 2. Tanks in gas actuated escape ramps.
Figure 3:
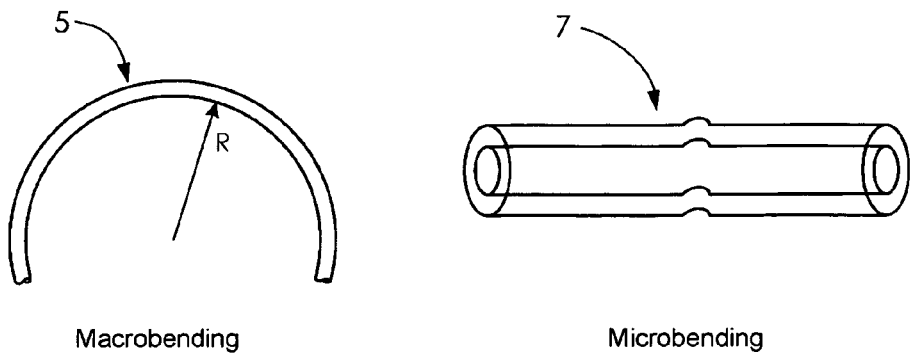
FIG. 3. Macrobending versus Microbending.

Transmitted light power is lost in response to microbending. The very small bend radius associated with microbending diminishes power when the highest-order guided mode in the fiber core is coupled to the first cladding (radiation) mode, which then is rapidly attenuated. FIG. 3 compares macrobending 5 and microbending 7. The curvatures of the bent fiber are very small, and very abrupt, for microbending than for the more gentle macrobending.

Figure 4:
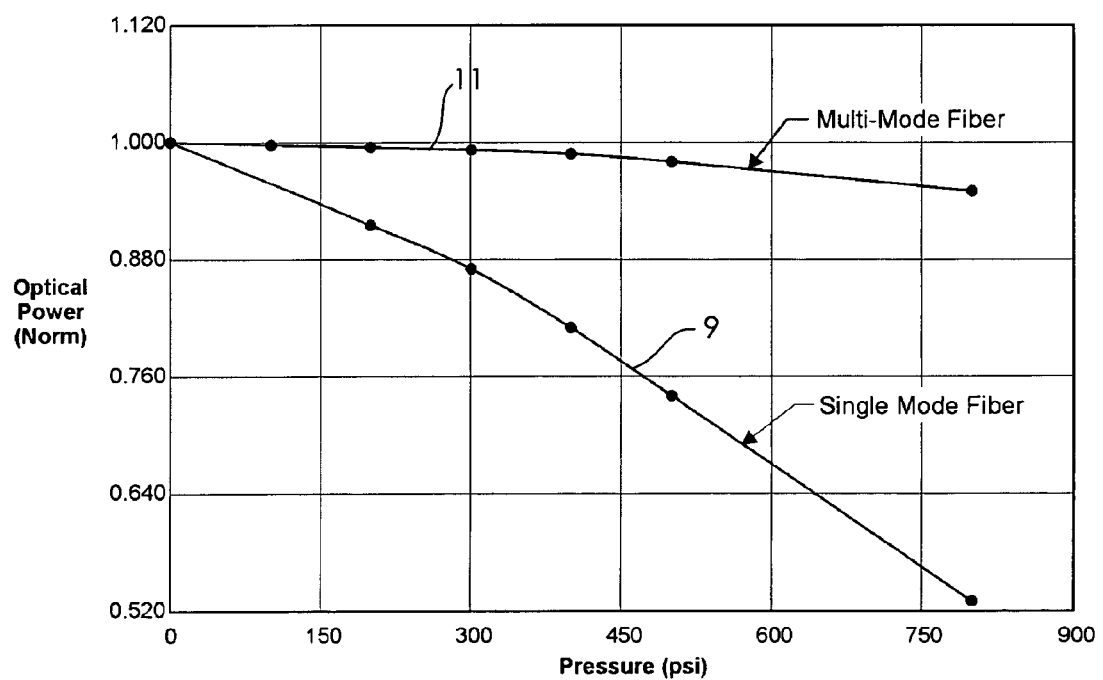
FIG. 4. Microbending Test Results.

Fibers are produced as single mode or multi-mode carriers of light. As shown in FIG. 4, single mode fibers 9 are more sensitive to microbending than are multimode fibers 11.

Numerical aperture is a good indicator of light loss for a bent fiber. The smaller the numerical aperture, the greater should be the light loss for a given bend radius.

Sensor Design

Dot Test Procedure

Fiber reinforced cylinders are to be hydrostatically tested in accordance with their exemption (see DOT-E7235, E9894, E9634 and TC Regulation 3FCM, 3HWM and SP3263). Composite cylinders manufactured in accordance with DOT Exemption and TC Regulations are to be hydrostatically tested periodically.

The hydrostatic test requires the tank to be pressurized to its service pressure and its volumetric expansion measured. Upon release of the pressure, the tank passes the test if the permanent volumetric expansion is equal to or less than 5% of the total expansion.

Test Procedure

An embedded microbend sensor can be used as an indicator of tank dilatation during tank pressurization. Thus, if the residual light attenuation is equal to or less than 5% of the total light attenuation, the tank passes the test. The advantage is that the tank does not need to be transferred to a hydrostatic test facility. It can be tested on-site and its down-time therefore is minimized. With this approach, the tank could be tested economically as frequently as each time the tank is filled with gas.

Sensor Layout

To create microbending, contra-helical layers of optical fiber are wrapped around the aluminum tank liner. Where the fiber crosses over itself at "pinch points", light power transmitted will be attenuated in proportion to internal tank pressure. The number of pinch points desired will depend on how the fiber is bonded to the liner.

Figure 5:
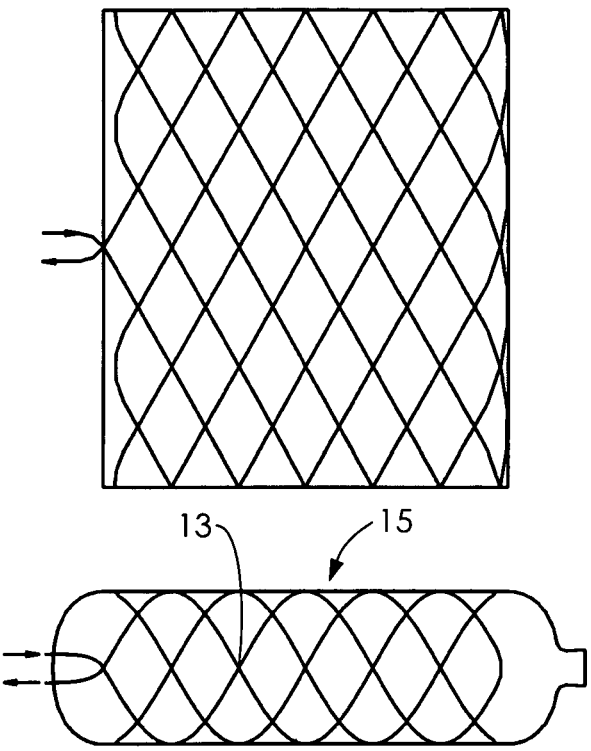
FIG. 5. Sparse Helical Wrap.
Figure 6:
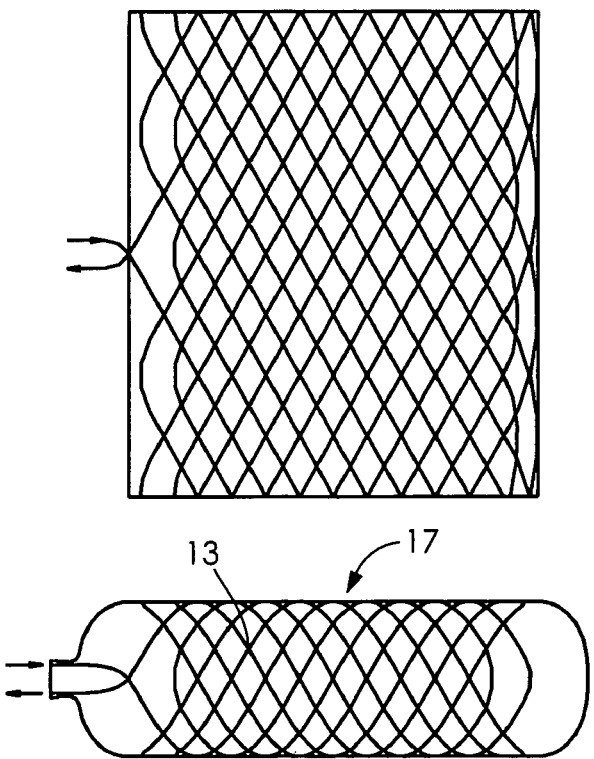
FIG. 6. Dense Helical Wrap.

For this simple sensing scheme to work effectively, it is important to have a sufficient number of fiber pinch points 13 to cover effectively the surface of the tank. Too many pinch points, however, could reduce the output light signal to zero. Several lay patterns investigated including sparse and dense wraps 15, 17 are shown in FIGS. 5 and 6.

Microbend Experiments

Figure 7:
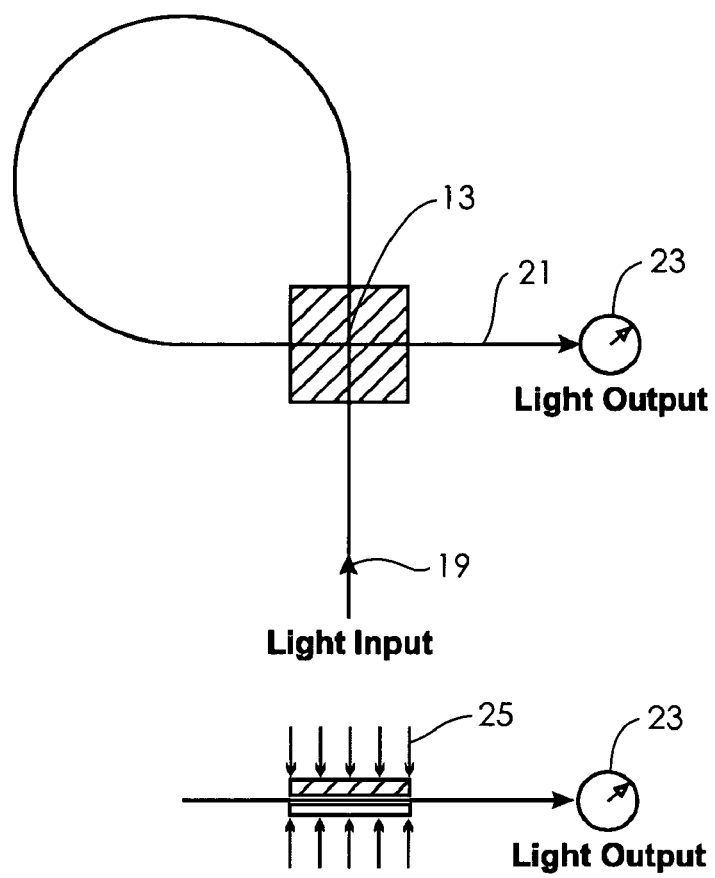
FIG. 7. Pinch Test.

Microbend experiments were conducted to simulate the optical signal generated in a crossed fiber embedded between the tank aluminum liner and composite overwrap. FIG. 7 is a schematic of the test that was performed for a single pinch point 13. Light attenuation was measured 23 in response to an applied pressure 25. Light is input at end 19 and output at end 21.

The microbend experiments provide data on the sensitivity of the sensor for different pinch point designs.

Pinch Point Design

Figure 8:
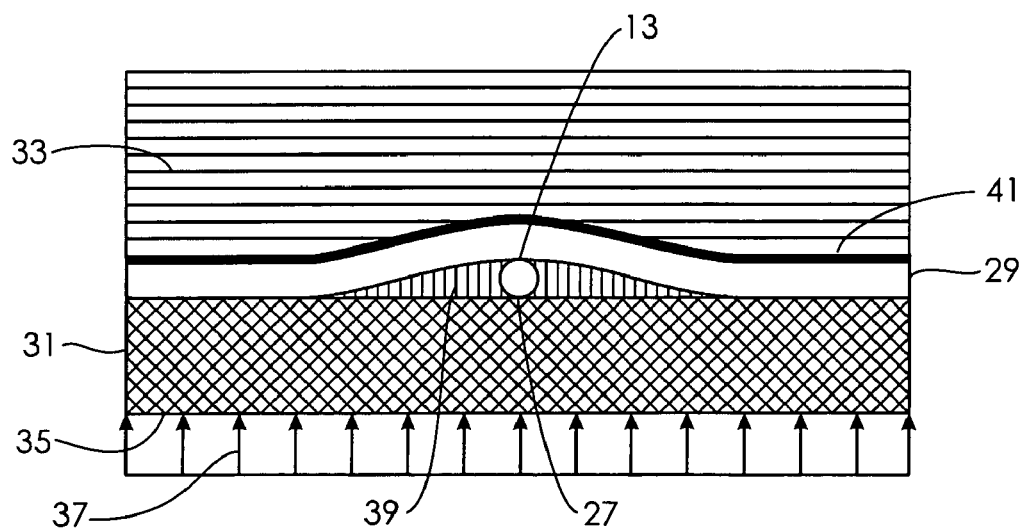
FIG. 8. Cross-section of Pinch Point.

FIG. 8 is a schematic of the cross-section of two contacting optical fibers 27, 29 embedded between the aluminum tank liner 31 and an overwrap of composite 33. As pressure 37 is applied at the inner surface 35 of the tank liner, the rigidity of the composite overwrap causes the overlapping fibers 27, 29 to pinch.

To control the optical signal (light attenuation across the pinch point), different filler materials 39 could be used or the interstitial volume around the pinch point 13 could be left vacant by use of an isolator film 41 that covers and seals the pinch point. A softer filler material would permit more microbending and a stiffer material less. A hard filler, a soft filler and no filler (using an isolator) to control light attenuation were investigated.

Fabrication

Figure 9:
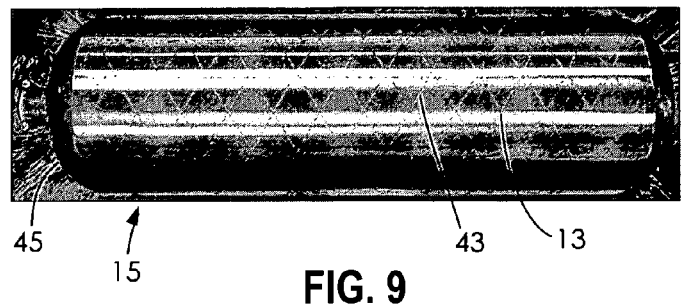
FIG. 9. Installed Optical Fiber Sensor
FIG. 10. Applicator Tip
FIG. 11. Fiber Applicator.

FIG. 9 shows a prototype 45 with a four-layer helical wrap 15 of optical fiber 43 installed following the pattern in FIG. 6. Its installation involves cleaning and degreasing the surface of the tank, marking the helical path for the fiber, laying the fiber onto the aluminum liner and bonding the fiber to the tank. Long fiber sensor leads are left near the top for attachment to the connectors.

A very low speed spindle (1-5 RPM) was designed to simplify installation of the optical fiber, application of the filler material and wrapping shrink tape over the sensor. To bond the fiber to the liner and provide filler material that encapsulates each pinch point, the fiber is drawn through a syringe containing filler material. A flexible Teflon tip dispenses the fiber and acts as a low friction scraper that controls the coating thickness.

Figure 10:
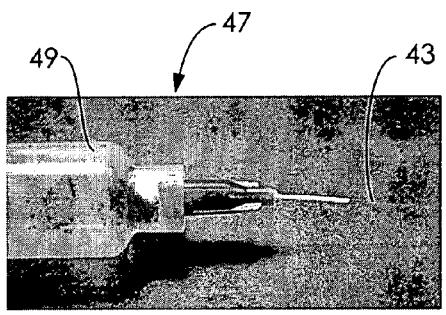

FIG. 10 shows the applicator tip 47 with the emerging fiber optic sensor. When drawn through the applicator tip 47, the coating thickness is sufficient to bond the fiber 43 to the liner.

Figure 11:
Figure 11:
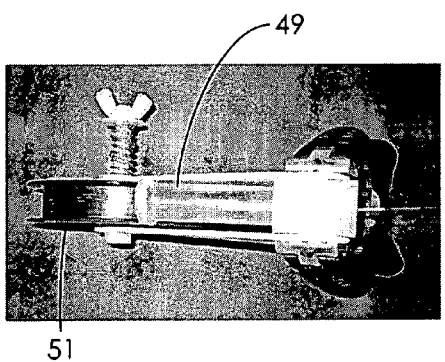

FIG. 11 shows the applicator tip 47 and syringe 49 installed in a dispensing reel 51 that includes fiber tension control using a compression spring.

Figure 12:
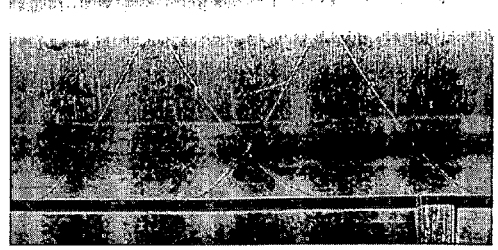
FIG. 12. Applying Filler-Coated Fiber
FIG. 13. Winding Shrink Tape
FIG. 14. Section View of the OFI Connector Mated to an ST Connector.

FIG. 12 shows the applicator being used to apply the fiber sensor to the aluminum liner that is rotated on the low speed mandrel.

A free length at each end of the fiber is left near the neck of the tank liner for assembly to the optical connectors.

Figure 13:
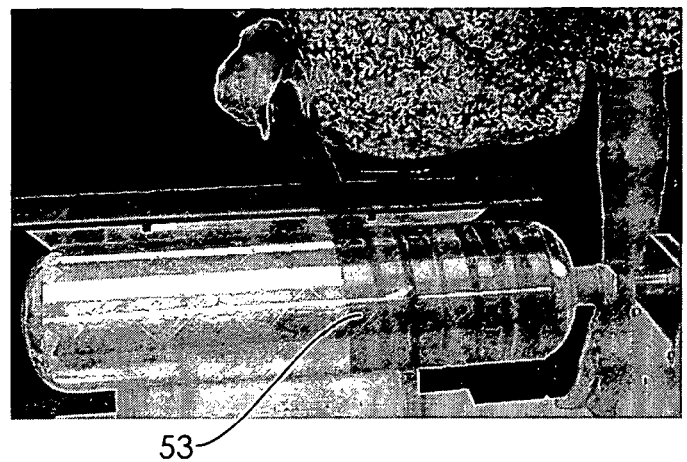

Next, shrink tape 53 coated with a release agent is wrapped over the installed fiber as shown in FIG. 13. The tank then is rotated under an infrared quartz heat lamp to both shrink the tape and provide a thermal cure to the filler material. The radial pressure produced by the shrink tape on the fiber improves the quality of the bond to the surface and ensures that the fibers are in contact at the pinch points.

FIG. 9 shows the completed installation of a fiber optic sensor ready for filament winding the composite overwrap.

FIG. 9 also shows optical connectors attached to the valve stem of the aluminum liner.

Optical Connector

The optical connectors must be sufficiently robust to survive rough handling of the tank and permit external instrumentation (laser light source and optical power meter) to be attached easily to the embedded sensor with minimal light power loss. The connectors are attached to the valve stem of the aluminum liner (FIG. 9).

Desired Connector Characteristics

1. The overall length and diameter of the connector should be as small as possible to minimize the potential for mechanical damage.

2. The connector should function with a light wavelength used for the optical fiber sensor, 3. The connector optical coupling loss should be significantly less than the optical signal produced by the microbend sensor.

4. The installation of the connector must be integrated into the filament-winding process without significantly complicating that process. Moreover, this integration must protect optical components throughout part processing.

5. The possibility of contamination of the connector optical components requires provisions for cleaning of optical surfaces.

Two methods of attaching connectors can be used. One method embeds the connector in the composite shell wall. The advantage of this approach is that the connector is better protected from external damage; however, it also produces an inclusion in the shell wall that compromises the structural integrity of the tank. A second method used to fabricate a prototype places the connector on the sides of the tank valve stem.

Figure 14:
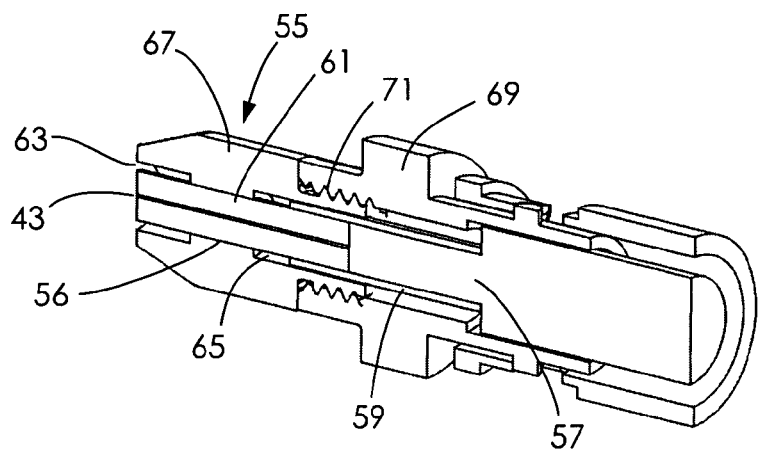

FIG. 14 is a scaled model of the connector 55.

To ensure low optical power loss across the connector, a commercially available ceramic ferrule 57 with a split spring sleeve 59 designed for ST connectors was selected.

As seen in FIG. 14, the OFI (optical fiber interface) ceramic ferrule 61 is housed in a custom-made connector housing 67. The optical fiber sensor 43 enters the ferrule 61 at the left end. The ferrule is located at the center of the connector housing 67 by a close-fitting cylindrical bore 56. Epoxy potting material fills the counterbored void 63 around the fiber end (left end) of the ferrule 61 to seal the ferrule in the connector 55. This potting is accomplished while the external connector is attached to ensure mutual concentricity. At the right end of the ferrule, a larger counterbore 65 permits entry of the spring sleeve 59.

The external connector 67 is attached to a modified ST bulkhead coupler 69.

In practice, the coupler first is screwed onto the connector body. The external ST connector 57 then is inserted into the coupler with a quarter-turn action. A compression spring in the external connector provides sufficient pressure for its ceramic ferrule to contact the OFI ferrule, and the spring sleeve provides concentric alignment between the two ferrules.

Figure 15:
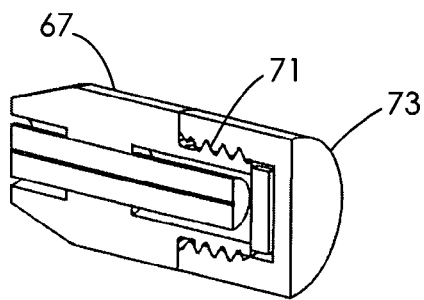
FIG. 15. Section View of Capped Connector.

Modification of the bulkhead coupler 69 consists of adding internal threads 71 to the left end of the coupler that mate with the connector body. The external threads on the connector body also can receive a protective cap 73 (FIG. 15). The cap is knurled for tightening by hand. A thin neoprene gasket inside the cap seals the ferrule from water and other environmental contamination. The connector is just slightly longer than the ferrule so that the polished face of the ferrule is protected, yet still is accessible for cleaning.

Connector Mounting

Figure 16:
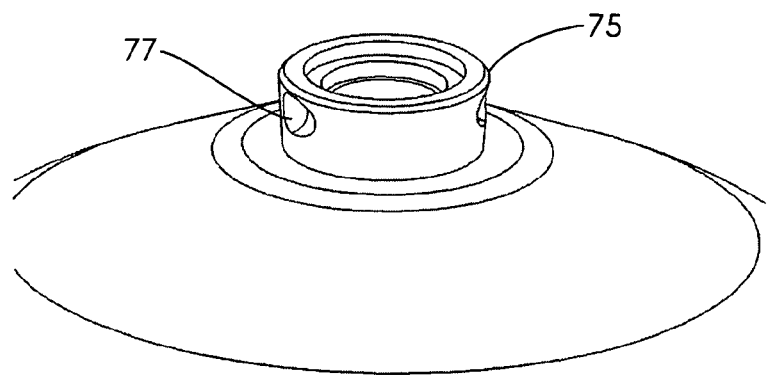
FIG. 16. Mounting Cutouts in Valve Stem
FIG. 17. OFI Connector Mounting.

Two shallow cutouts 77 are machined directly into the valve stem 75 as shown in FIG. 16. There is sufficient thickness in the valve stem 75 that the material will not fail under test pressures. The valve stem can be made so that the cutouts are in an unpressurized area.

Figure 17:
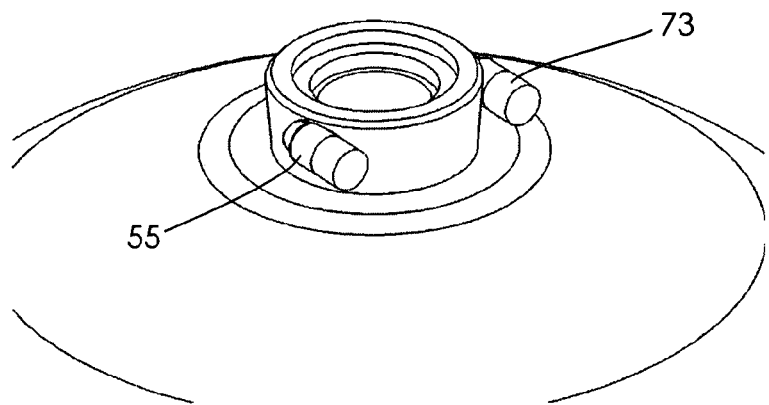
Figure 18:
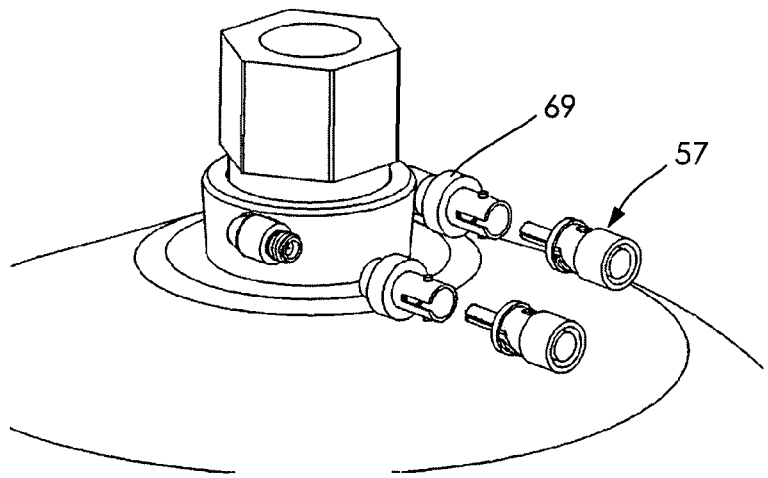
FIG. 18. Attaching ST Connectors.

FIG. 17 shows the OFI connector 55 bonded into the valve stem cutouts. The optical fiber exits the connector tangent to the valve stem and is helically wrapped around the valve stem down to the liner surface. A thin layer of potting material is placed over the fiber for protection and to seal the back of the connector. FIG. 18 illustrates how ST connectors 57 are attached to the OFI couplers 69.

Figure 19:
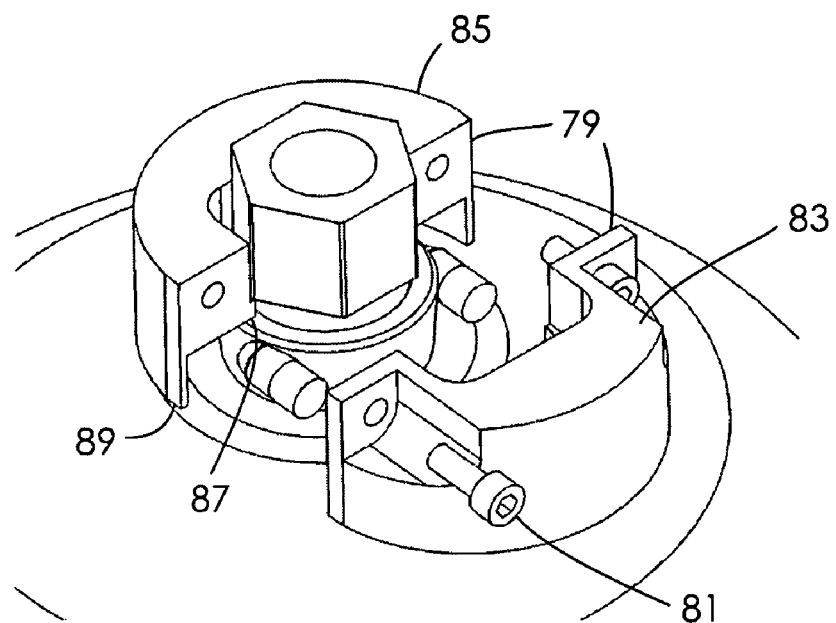
FIG. 19. Shield Components.
Figure 20:
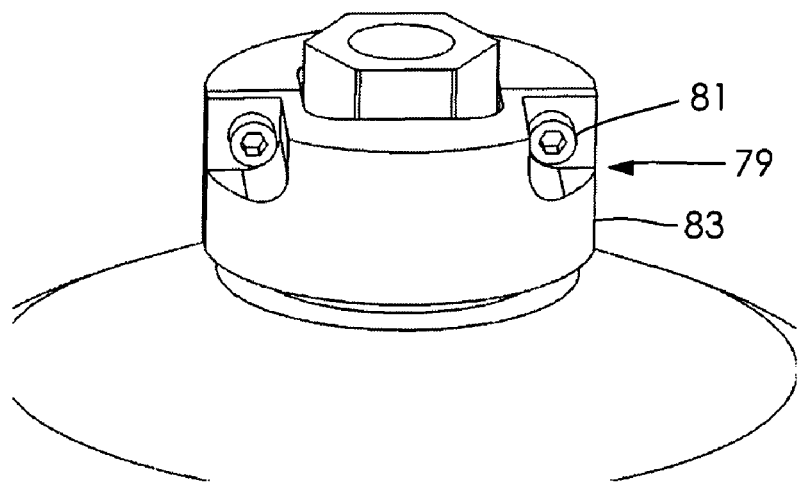
FIG. 20. Assembled Shield.

Since the mounted OFI connector protrudes from the valve stem it is susceptible to damage during normal handling of the tank. Therefore, the two-piece shield 79 shown in FIG. 19 is designed to protect the connectors. The shield is assembled transversely to the axis of the tank. Two cap screws 81 clamp the two sides 83, 85 of the shield to the pipe fitting. A rib 87 on the shield fits into the gap between the pipe fitting and the top surface of the valve stem to restrain the shield axially. A skirt 89 around the bottom of the shield encompasses the capped OFI connectors to protect them from damage. The shield must be removed to take a measurement. FIG. 20 shows the fully assembled shield.

The size of the connector housing 67 is significantly smaller than a standard commercial ST connector. By using ST connector components, a standard telecommunication fiber can be used, and light attenuation is comparable to commercial connectors. After the fiber sensor is applied to the tank liner, the connector is attached to the fiber and then the connector is attached to the valve stem. The optical fiber is bonded to the liner along its entire length including the fiber leads to the connector. When the protective cap is attached to the connector housing, the entire sensor is sufficiently ruggedized to permit handling and filament winding following current manufacturing procedures.

With the protective cap removed, the optical end of the ceramic ferrule can be accessed for cleaning.

Connector Fabrication

Connector Housing

Figure 21:
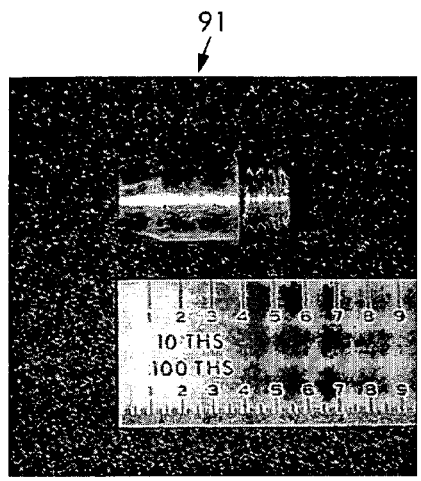
FIG. 21. Connector Housing.
Figure 22:
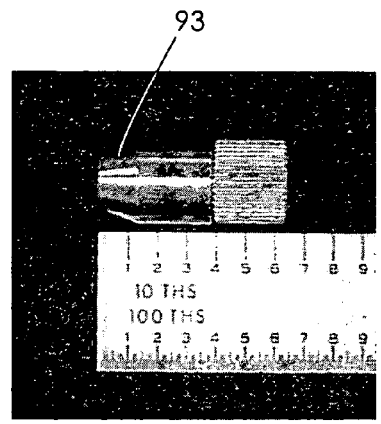
FIG. 22. Capped Housing.
Figure 23:
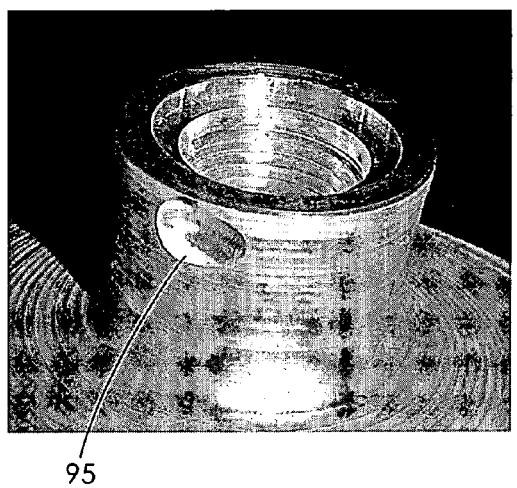
FIG. 23. Groove in Valve Stem
FIG. 24. Mounted Housings.
Figure 24:
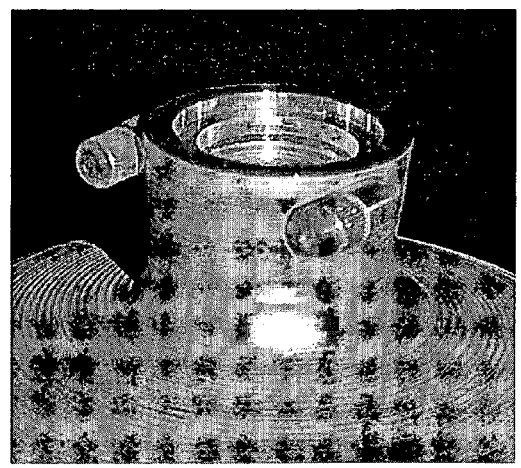

The connector housing 91 that attaches to the valve stem of the tank liner is shown in FIG. 21. The left end of the housing has a conical taper 93 to fit the mating slot 95 in the valve stem (FIG. 23). The right end is threaded to accept a knurled cap with a neoprene seal to protect the internal ceramic ferrule (FIGS. 15 and 22). FIG. 24 shows how the housing mounts to the tank valve stem. The conical taper provides positioning of the housing such that the fiber sensor exits the housing tangential to the surface of the valve stem.

Coupler

Figure 25:
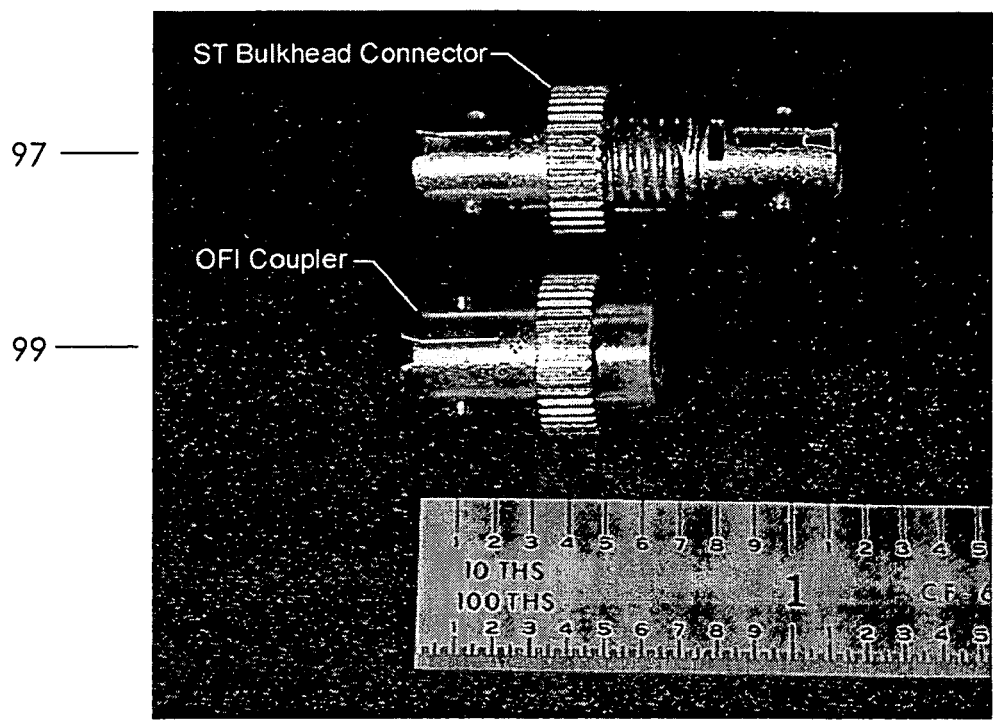
FIG. 25. OFI Coupler Modified from a Standard ST Bulkhead Connector.
Figure 26:
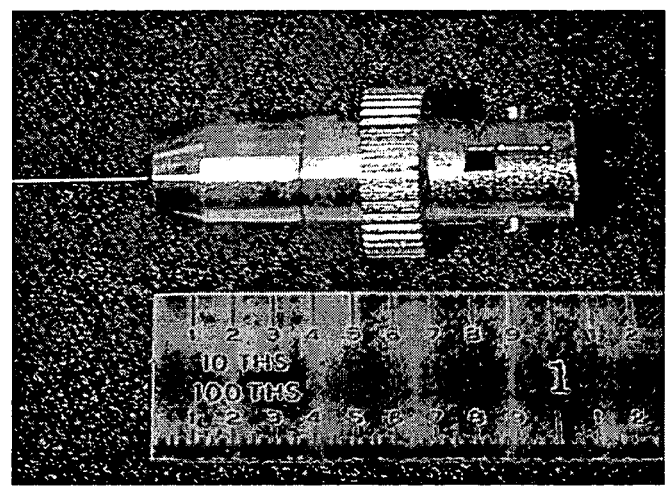
FIG. 26. Coupler Mated to Connector Housing.

A standard type ST bulkhead connector 97 was modified to fabricate the OFI coupler 99 shown in FIG. 25. The right end of the connector was cut to reduce its overall length. The diameter was reduced to a diameter sufficient to remove the external threads. Finally, internal threads to match the threads on the connector housing were added to the right side of the bulkhead fitting. Assembly of the coupler and housing is shown in FIG. 26.

The coupler can be attached to an external optical cable.

Install Connectors

The optical leads are wrapped around the tank and valve stem to locate the connectors near the stem grooves (FIGS. 16 and 23).

Figure 27:
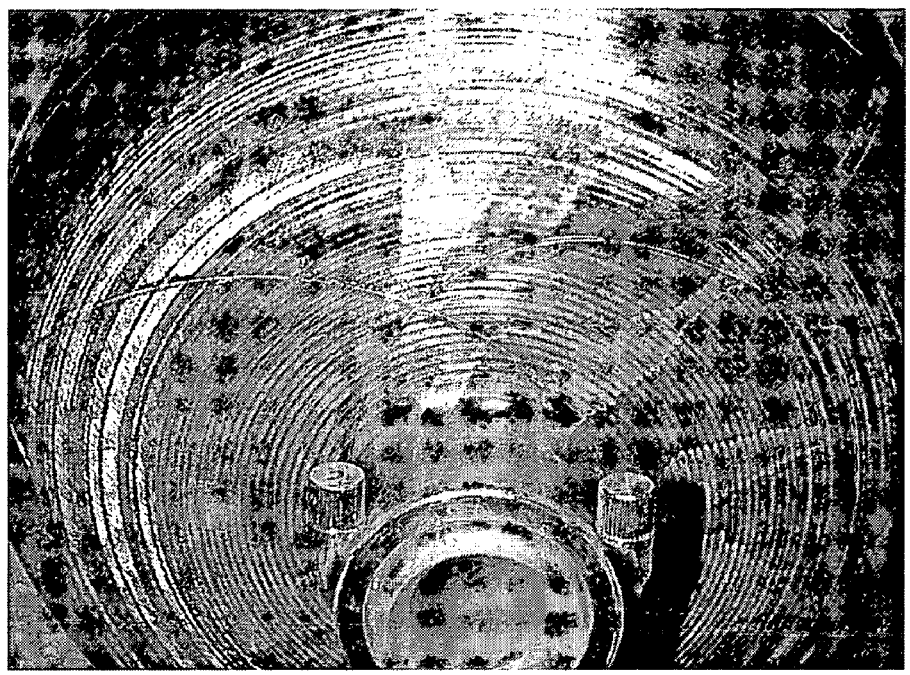
FIG. 27. End Connectors.
Figure 28:
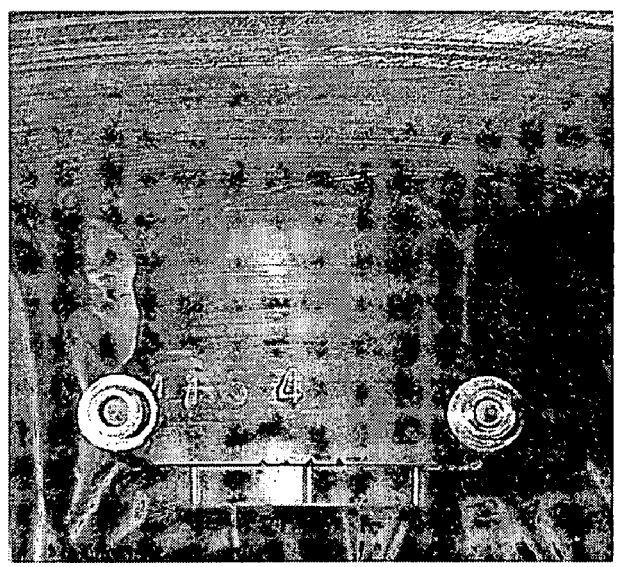
FIG. 28. Connectors Showing Optical Ferrules.

FIG. 27 shows how the fiber sensor has been wrapped around the valve stem and looped and bonded at the tank end. Also shown are water-tight caps that protect the connector optical ferrule from mechanical damage and contamination during filament winding. FIG. 28 is a view into the connectors showing the internal optical ferrules.

Integrating Sensor Installation and Filament Winding

Figure 29:
FIG. 29. Progression of Axial Winds
FIG. 30. Prototype Tank
FIG. 31. Sensor Performance.

The optical fiber sensor and connector have been fully bonded to the aluminum liner as described in the previous sections. In this condition, they should be sufficiently rugged to allow the tanks to be handled and filament wound using standard manufacturing procedures (FIG. 29). Also, by locating the connectors near the top of the valve stem, the stem still can be used as a turn-around for reversing the wind. To prevent the connectors from being contaminated by adhesive during filament winding, protective caps are used to seal the optical ferrule.

Composite Tank

The tank consists of an aluminum liner and a filament-wound composite overwrap. The aluminum liner serves as a mandrel for filament winding and the primary seal for the pressurized gas. It has one end threaded to attach a pressure regulator valve. The composite overwrap provides the primary strength to the tank. A fiber optic sensor is sandwiched between the liner and composite overwrap to monitor tank dilatation and optical connectors are attached to the valve stem.

Figure 30:
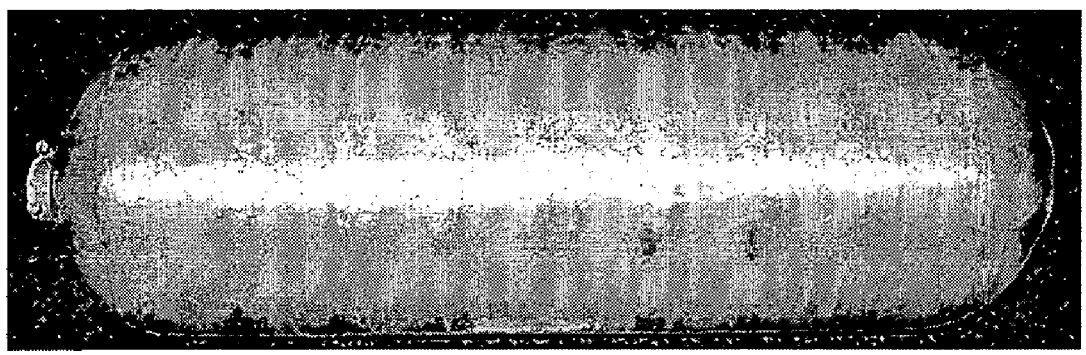

FIG. 30 shows a completed prototype tank with composite overwrap and optical connectors located on the valve stem at the top of the tank.

Discussion

Figure 31:
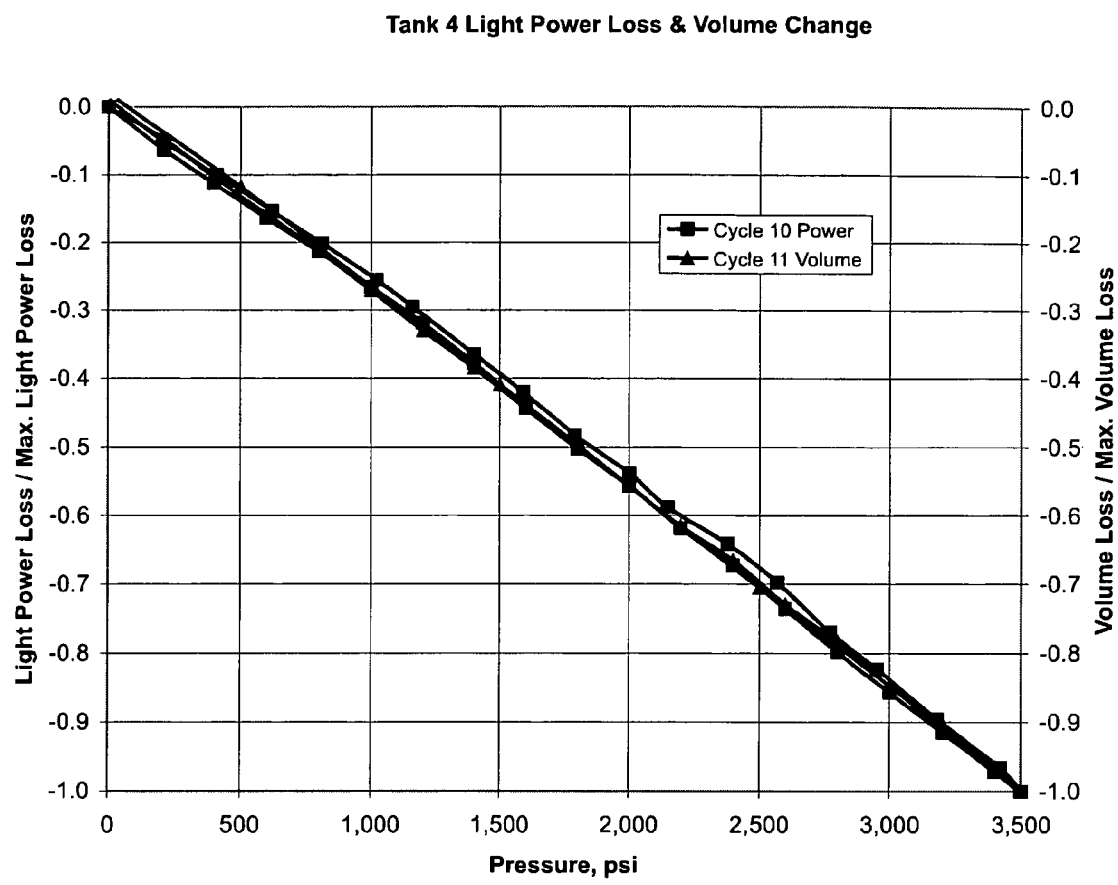

The fiber sensor is able to reveal a residual change of light power following pressurization to the rated tank pressure that in normalized form agrees numerically with residual tank volume change (FIG. 31). The fiber optic sensor can be successfully integrated into the manufacture of composite tanks at low cost. The fabrication of the sensor and connector and their installation onto an aluminum liner potentially is a simple process. The tank liner first is attached to a sensor winding machine. The fiber is coated with an adhesive and wound onto the liner. Shrink tape is wrapped around the installed fiber and it is then thermally cured. Finally the connectors are attached to the fiber and the aluminum valve stem. The fiber system now is sufficiently rugged to handle and filament wind so that no change in manufacturing procedures is needed.

Novel concepts include, but are not limited to:

1. A low-cost, telecommunication single-mode optical fiber can function as an effective microbend sensor when placed in the wall of a composite tank. With microbend sensing, an inexpensive, hand-held light source/power meter is all that is required to monitor the structural health of a tank.

2. The fiber sensor is contra-helically wrapped around an aluminum liner. The number of pinch points (fiber crossings) can be adjusted to control the microbend signal by the number of helical wraps.

3. By preassembling the fiber sensor and aluminum liner, the tank can be handled and filament wound using standard manufacturing techniques.

4. Pinch points where the fiber sensor crosses itself can be filled with a material that regulates light power loss across the points. This has demonstrated the effect of isolating the pinch points, bedding the points with a soft material or bedding the points with a hard material.

5. A simple, economical method of coating the fiber with a bonding material while it is applied to the tank liner is used.

6. A new optical connector that is about half the size of a commercial connector was developed and tested. Its smaller size helps to reduce mechanical damage to the connector when handling of the tank, it also made it possible to locate the connector on the valve stem of the tank. The connector adapts to existing ST-type optiware. To ensure that optical readings are repeatable, the connector uses a polarized connection so that the angular position of mating ferrules is maintained.

The purpose of the optical fiber microbend sensor is to simulate the hydrostatic volumetric test required by the U.S. Department of Transportation for all composite tanks. Since the fiber sensor can replace the hydrostatic test, tanks with an installed fiber optic sensor can be tested in-situ at low cost and with no loss of use of the tank. Moreover, in-situ testing can be done more frequently than required by the DOT which could lead to extending the useful service life of composite tanks.

The fiber sensor is able to reveal a residual change of light power following pressurization to the rated tank pressure that in normalized form agrees numerically with residual tank volume change. Prototype tanks that were tested demonstrated this capability. While the invention has been described with reference to specific embodiments, modifications and variations of the invention may be constructed without departing from the scope of the invention, which is defined in the following claims.

I claim:

1. A sensor apparatus for tank volume change, comprising a tank, a telephone grade optical fiber coated with adhesive would on the tank, and having the adhesive cured on the tank, adhering the fiber on the tank and ruggedizing the fiber on the tank, the optical fiber having opposite ends exposed for receiving and outputting light energy, and a covering over the optical fiber, wherein the optical fiber is wound helically in first spaced coils over the tank in a first direction and is wound helically in second spaced coils over the tank and over the first spaced coils in a second direction, and wherein the first spaced coils form the obstructions and the second spaced coils form micro bends where the second spaced coils cross over the first spaced coils as micro bend pinch points, wherein the tank comprises an aluminum tank liner, and the covering comprises a strengthening wrap wound over the composite gas storage tank, wherein the fiber is squeezed between the tank liner and the strengthening wrap as the tank liner is pressurized, deforming the micro bend pinch points.

2. The apparatus of claim 1, wherein the first and second spaced coils are secured to the tank.

3. The apparatus of claim 1, wherein the bends and the pinch points are secured to the tank with a flexible adhesive.

4. A method of providing sensors for tank volume changes, comprising:
   providing a tank;
   providing an optical fiber on the tank;
   providing obstructions on the tank liner;
   providing micro bend pinch points in the optical fiber by crossing the optical fiber over the obstructions;
   securing the entire optical fiber or at least the micro bend pinch points to the tank;
   providing and exposing ends on the optical fiber for receiving light and outputting light; and
   covering the optical fiber and the tank.

5. The method of claim 4, wherein the providing the tank comprises providing a cylindrical tank liner, wherein the providing an optical fiber and obstructions on the tank comprises winding the optical fiber in first spaced helical convolutions in a first direction along the cylindrical tank liner and winding the optical fiber in second spaced helical convolutions in a second direction along the cylindrical tank liner and forming the micro bend pinch points in the second spaced helical convolutions where they cross over the first helical convolutions of the optical fiber.

6. The method of claim 5, wherein the covering comprises covering the optical fibers with an isolator layer.

7. The method of claim 5, wherein the securing comprises coating the optical fiber with a settable adhesive as the optical fiber is wound on the tank.

8. The method of claim 5, wherein the securing comprises coating crossover micro bend pinch points with a flexible settable adhesive.

9. The method of claim 6, wherein the covering further comprises providing filament windings over the isolator layer of the optical fiber and over the tank liner for supporting internal pressures within the tank liner.

10. The method of claim 9, further comprising connecting a light source to one end of the optical fiber and connecting a light sensor to the other end of the optical fiber, increasing pressure within the tank liner, increasing bending in the micro bend pinch points by resisting the increasing pressure with the filament windings, and observing transmitted light attenuation in the light sensor related to expansion of the tank liner and increasing bending of the micro bend pinch points.

11. A Pressure tank apparatus, comprising a tank having an inlet and outlet, an optical fiber secured to an outer surface of the tank and having opposite ends for receiving and outputting light, the opposite ends being fixed near the inlet and outlet for connecting respectively to a light source and to a light sensor as the tank is filled with gas under pressure, the optical fiber crossing over itself on the outer surface of the tank and forming micro bends and micro bend pinch points where the optical fiber crosses over itself, and a composite material overwrap covering the optical fiber and for withstanding internal pressure within the tank and resisting expansion of the tank.

12. The apparatus of claim 11, further comprising optical couplings connected to the ends of the fibers and secured to the inlet and outlet of the tank.

13. The apparatus of claim 11, further comprising thin adhesive connecting the optical fiber to the outer surface of the tank.

14. The apparatus of claim 13, further comprising a relatively flexible adhesive at the optical fiber (micro bend pinch points).

15. A pressurized fluid storage tank apparatus comprising
- a fluid impervious aluminum tank liner for containing the fluid under pressure
- the fluid impervious liner having cylindrical a body with a closed hemispherical end and an opposite fluid transfer connection neck,
- a tank liner expansion indicating telephone grade optical fiber helically wrapped around and bonded to the tank liner with epoxy or polyurethane bonding agents in crossed first and second helixes from the neck to the closed end and back to the neck, the telephone grade optical fiber in the second helix having cross over points forming micro bend pinch points, the fiber having first and second ends, the first and second ends of the fiber mounted near the neck of the tank, and first and second optical connectors on the first and second ends of the telephone grade optical fiber for connecting to a laser light source and a light intensity sensor to the first and second ends respectively,
- an outer composite strength-providing wrapped layer around the cylindrical body and the hemispherical end and around the crossed helixes of the optical fiber for preventing excessive outward expansion and failure of the fluid impervious liner and for squeezing the micro bend pinch points at the cross over points of the optical fiber between the fluid impervious tank liner and the outer strength-providing layer.

16. The apparatus of claim 15, wherein the squeezing of the micro bend pinch points at the crossover points of the fiber optic cable results in a diminution of the high intensity sensed at the sensor.

17. The apparatus of claim 15, wherein the light intensity sensed by the sensor has an inverse linear relation to pressure within the tank liner.

* * * * *